(12) United States Patent
Wasula et al.

(10) Patent No.: US 6,206,287 B1
(45) Date of Patent: Mar. 27, 2001

(54) FILM OPTICAL IMAGE BAR CODE READER

(75) Inventors: John L. Wasula, Rochester; Steven M. Bryant, Holley, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/137,566

(22) Filed: Aug. 21, 1998

(51) Int. Cl.[7] .............................. G06K 9/10; G06K 19/06
(52) U.S. Cl. .................. 235/462.05; 235/462.16; 235/462.41; 235/454; 235/456
(58) Field of Search ................... 235/462.05, 462.16, 235/462.41, 454, 456; 250/570

(56) References Cited

U.S. PATENT DOCUMENTS

| | | |
|---|---|---|
| 4,903,131 | 2/1990 | Lingemann et al. . |
| 4,918,484 | 4/1990 | Ujiie et al. . |
| 4,965,628 * | 10/1990 | Olliver et al. ...................... 355/41 |
| 4,994,918 | 2/1991 | Lingemann . |
| 5,122,645 | 6/1992 | Saeki et al. . |
| 5,128,519 | 7/1992 | Tokuda . |
| 5,164,574 | 11/1992 | Ujiie et al. . |
| 5,309,199 | 5/1994 | Frick . |
| 5,317,139 * | 5/1994 | Evans et al. ...................... 235/454 |
| 5,353,096 | 10/1994 | Frick et al. . |
| 5,376,780 * | 12/1994 | Klueter ............................... 235/454 |
| 5,402,166 | 3/1995 | Mead et al. . |
| 5,448,049 | 9/1995 | Shafer et al. . |
| 5,565,912 | 10/1996 | Easterly et al. . |
| 5,598,249 | 1/1997 | Kuwayama et al. . |
| 5,644,376 | 7/1997 | Vetter . |
| 5,665,950 * | 9/1997 | Rottner et al. ...................... 235/375 |

* cited by examiner

*Primary Examiner*—Michael G Lee
*Assistant Examiner*—Douglas X. Rodriguez
(74) *Attorney, Agent, or Firm*—Francis H. Boos, Jr.; Roland R. Schindler, II

(57) ABSTRACT

A bar code reader particularly useful in a photographic film scanner of the type employing a light source and CCD array for sensing the bar code elements. Lateral location of the bar code pattern is established by analyzing the output of the CCD array within a bar code detection window to determine the location of a longitudinal edge transition of the line of clock elements in the bar code pattern and then to use clock and data element detection windows at spaced locations from the line of clock edge transition to read the encoded values of the bar code. In one embodiment, the line of transition between the clock and data elements is used as the line of longitudinal edge transition of the line of clock elements. In another embodiment, the longitudinal clock edge transition remote from the data elements and adjacent the central image frame region is used.

18 Claims, 8 Drawing Sheets

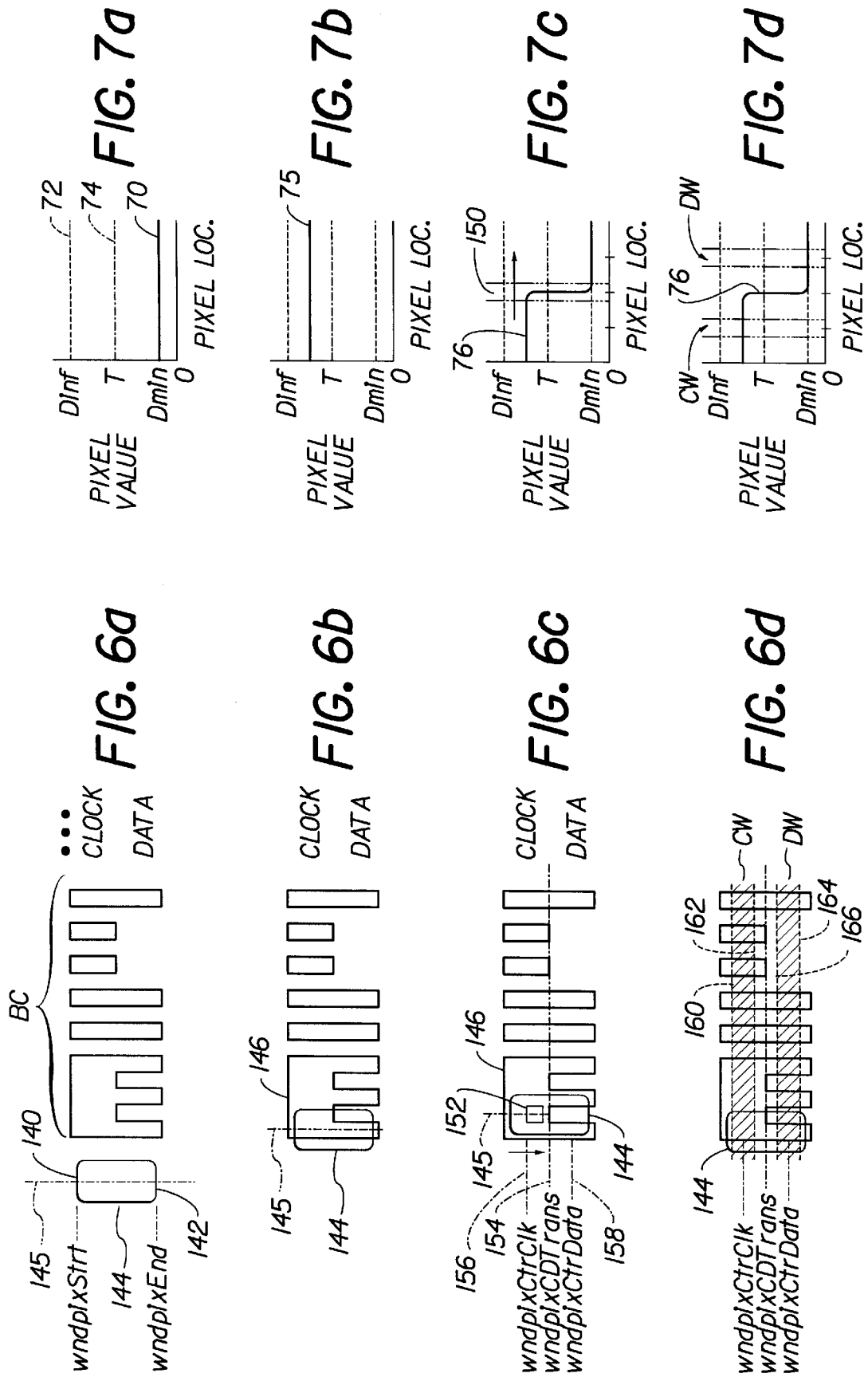

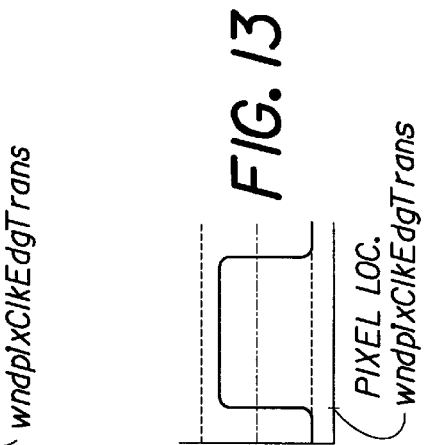
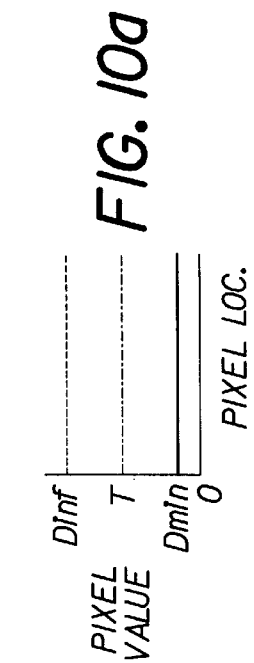
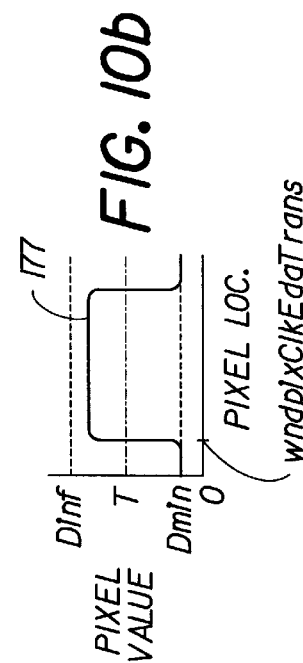
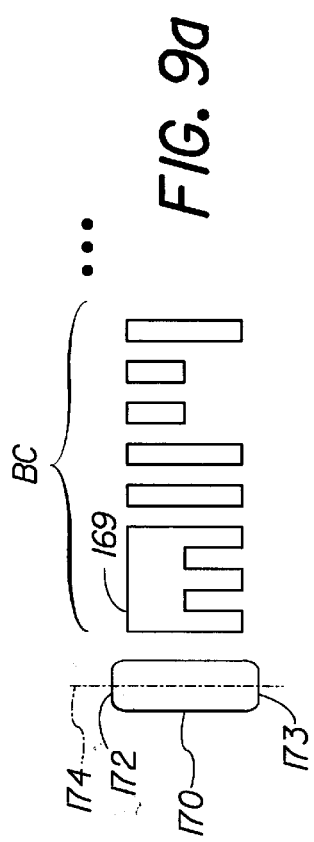

FILM OPTICAL IMAGE BAR CODE READER

CROSS REFERENCE TO RELATED APPLICATIONS

Cross reference is made to the following commonly assigned, copending U.S. Applications: Ser. No. 09/084,062, entitled "ILLUMINANT HEAD ASSEMBLY FOR FILM IMAGE SCANNER"; Ser. No. 09/083,604, entitled "IMAGING APPARATUS FOR A PHOTOGRAPHIC FILM IMAGE SCANNER"; Ser. No. 09/085,730, entitled "FILM DRIVE APPARATUS FOR A PHOTOGRAPHIC FILM SCANNER".

FIELD OF THE INVENTION

The invention relates generally to a method and apparatus for adaptively locating and reading an optical image bar code imprinted along an edge of a filmstrip and, in particular, to such a reader in which detection of an edge of the filmstrip is not feasible.

BACKGROUND OF THE INVENTION

Commonly assigned U.S. Pat. No. 5,448,049 describes a bar code reader of the type utilizing an illumination source and a linear array of CCD elements extending transversely from one side wall of the film transport path. When suitably clocked out, each CCD element provides a signal dependent on the intensity of the illumination received. The output signals from the CCD array are processed to detect an edge of the filmstrip by the contrast in signal amplitude due to attenuation of the transmitted light intensity by the filmstrip substrate at the junction of the filmstrip with a gap separating the filmstrip edge and the side wall of the transport path. The bar code pattern is in a fixed position relative to the edge of the filmstrip and, therefore, once the edge of the filmstrip is identified, the (bar code segments can be readily located relative to the film edge for sampling and digitizing to discern the bar code pattern and resultant code value irrespective of any sideways motion ("wander") of the filmstrip through the reader. Location of the film edge and thus of the bar code pattern segments relies on the detection of the transition between light transmitted directly from the light source and light transmitted through the filmstrip.

This type of bar code location and reading apparatus, while effective, has a disadvantage that it is not readily adaptable to use in a compact film scanner as part of a film scanning gate in which both film image and marginal optical data is detected by a common CCD array. If unfiltered light outside the edge of the film is allowed to pass on to the CCD array, the unfiltered light introduces overall flare on the CCD in the image detection area and reduces the contrast of the image. Such unfiltered light can also create specular effects that can produce what is referred to as "hot spots" in the detected image. Additionally, filtered light, that is, light passing through the filmstrip, can bounce off the sides of the imaging channel housing which can produce ghost reflections in the detected image.

It is an object of the present invention, therefore, to provide a bar code image detection and reading method and apparatus utilizing a linear sensor array, such as a CCD, that does not rely on detection of the edge of the filmstrip on which the bar code pattern is imprinted.

It is also an object of the invention to provide a film scanning imaging channel that performs both image scanning and bar code reading through an imaging aperture using a common linear CCD array.

SUMMARY OF THE INVENTION

In accordance with one aspect of the invention, there is provided a bar code reader for reading a optical bar code image having parallel rows of clock and data elements extending longitudinally along the length of a filmstrip, the row of clock elements having at least one longitudinally extending edge transition, the reader. The reader comprises a film path, an illuminant source, a linear, pixel-by-pixel light sensor array for detecting illuminant from said source passing through said filmstrip in a region encompassing said bar code image, and a scanning aperture defining a window of exposure of said illuminant source through said bar code onto said light sensor array. The reader further includes a data processing controller responsive to output information from the light sensor array from within said bar code exposure window for locating said longitudinal edge transition of an element in the row of clock elements and for determining binary values of the clock and data elements from the sensor array output information at predetermined spaced locations relative to the located edge transition of the element in the row of clock elements.

In another aspect of the invention, there is provided a method in a film scanner of adaptively locating and reading a bar code image imprinted adjacent an edge of a filmstrip, the bar code image having abutting rows of clock and data elements said clock elements having a line of edge transition extending longitudinally along the filmstrip, the film scanner having an illuminant source and a linear light sensor array for detecting light from the illuminant source transmitted through said bar code image. The method comprises passing said filmstrip bar code image over a bar code scanning aperture, transmitting said illuminant light through said bar code image and scanning aperture toward said light sensor array thereby defining a window of exposure of said illuminant light onto said linear light sensor array, processing output information from said light sensor array to determine lateral location of said clock element line of edge transition, and determining from light sensor array output information, at predetermined spaced locations from said line of clock edge transition, binary values of the clock and data elements in the bar code image. The line of edge transition used for locating the bar code may be either the line of transition between the clock and data elements or the clock element edge which extends in the longitudinal direction of the filmstrip which is remote from the data elements adjacent the image frame area of the filmstrip.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIGS. 6a–6d are diagrammatic illustrations useful in explaining the operation of the embodiment of FIG. 5;

FIGS. 7a–7d are pixel value graphs useful in explaining the operation of the embodiment of FIG. 5;

FIGS. 9a–9b are diagrammatic illustration useful in explaining the operation of the embodiment of FIG. 8;

FIGS. 10a–10b are pixel value graphs useful in explaining the operation of the embodiment of FIG. 8;

FIG. 12 is a diagrammatic illustration useful in explaining the operation of the embodiment of FIG. 11; and FIG. 13 is a pixel value graph useful in explaining the operation of the embodiment of FIG. 11.

DETAILED DESCRIPTION OF THE INVENTION

Figure 1:
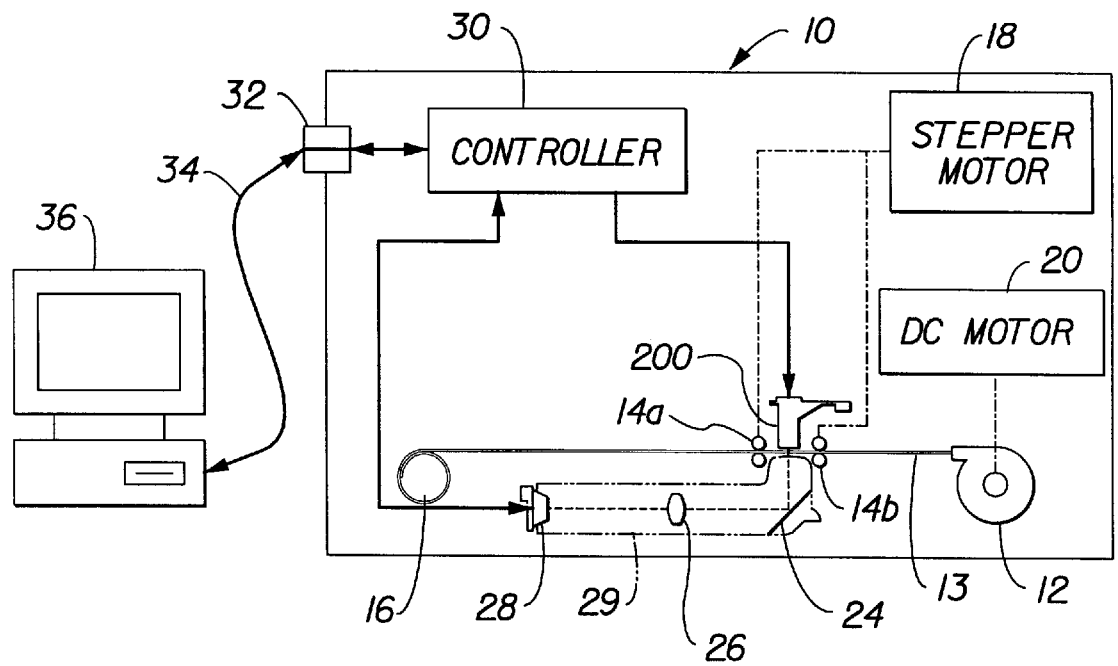
FIG. 1 is a schematic diagram of a photographic film scanner of the type for which the present invention is particularly adapted.
Figure 2:
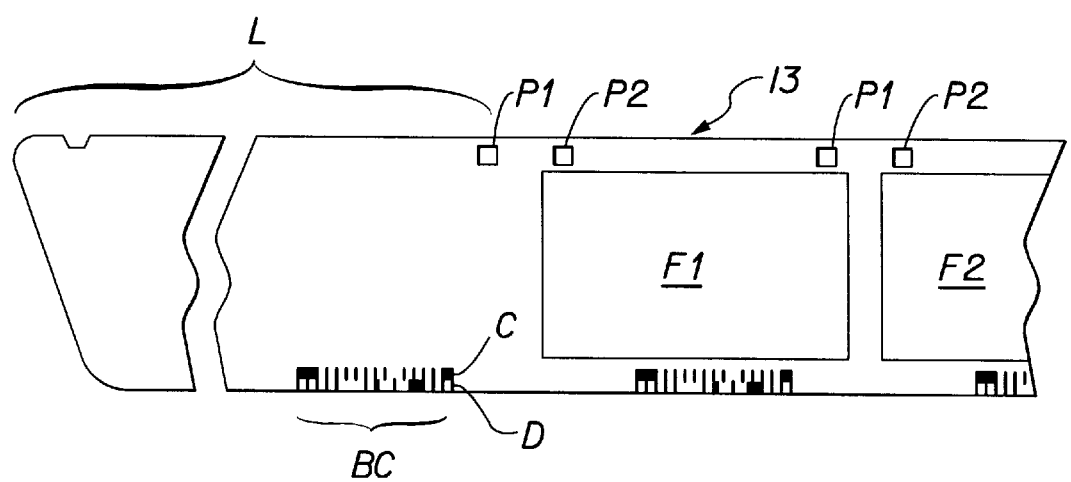
FIG. 2 is a portion of a filmstrip having a bar code image pattern to be detected by the scanner of FIG. 1.

In FIG. 1, a film scanner 10 is shown schematically and has therein a film supply cartridge 12 from which a processed filmstrip 13 extends through a film transport mechanism, comprising a pair of nip rollers 14a, 14b, to a film takeup chamber 16. FIG. 2 illustrates a portion of an Advanced Photo System (APS) processed filmstrip 13 for use in the scanner 10. The filmstrip comprises a leader portion L and a series of image frame areas F1, F2. The positioning of the image frame areas are set at the time of exposure in the camera by reference to perforations pairs P1, P2 spaced evenly along one marginal edge region of the filmstrip. At the time of film manufacture, an optical bar code image BC is imprinted repetitively in the longitudinal direction of the filmstrip along the marginal edge region opposite that of the perforations and adjacent to each frame area. An initial bar code is provided in the leader portion just ahead of the first image frame F1, as shown in the drawing. In general, the bar codes each comprise a longitudinal row of clock elements C and a longitudinal row of data elements D. The data elements provide information about the filmstrip characteristics as well frame numbers uniquely identifying each of the image frame areas. The initial bar code in the leader portion also includes filmstrip specific information, such as roll length (i.e. number of image frames on the filmstrip) and roll ID number, both of which are important to have read before image frame scanning is commenced. It should be noted at this point that, while the invention will be described in association with APS film, it is equally applicable to other types of film having a marginal bar code image such as conventional 35 mm film.

The nip rollers are driven by a stepper motor 18 in the forward direction during high speed film advance and low speed image scanning and in the reverse direction during high speed rewind of the film into the film cartridge. A dc motor 20 couples with the spool of the film supply cartridge to initially thrust the filmstrip from the cartridge to the nip rollers and later to drive the cartridge spool in the reverse direction during rewind of the film back into the cartridge. The space between the nip rollers 14a, 14b is an imaging gate, also referred to as a scan gate, and accommodates an illumination and imaging channel comprising an LED illuminant head assembly 200 for producing and transmitting scanning light through the film and an imaging assembly 29 for focusing the transmitted image light onto a light sensor. The illuminant head assembly 200 preferably comprises a centrally located linear array of interleaved, spectrally separated LED light sources emitting light respectively in the red, blue and green spectra for use in scanning the image frames on the filmstrip. By separately controlling the ON times of the red, blue and green LEDs the proper amount of light for each color is sent through the image frames regions of the filmstrip to achieve a balanced color image from the film. Separate LED light sources are located at opposite ends of the linear array to transmit light through the marginal edge regions of the filmstrip. The imaging assembly 29 comprises a mirror 24, a focusing lens 26 and a linear array CCD sensor 28. The CCD sensor is preferably a trilinear sensor having three parallel sensor array each covered with one of a suitable red, blue and green filter to render the linear sensors separately responsive to the red, blue and green LED illuminants from the illuminant assembly.

The transport mechanism comprises DC motor 20 connected to the spool film cartridge 12 for thrusting the film out of the cartridge and for rewinding the film back into the cartridge at the conclusion of scanning. Once the film has been thrust out of the cartridge the film encounters the two sets of nip rollers 14a, 14b that are controlled by stepper motor 18. The nip rollers are placed such that one set is on either side of the frame imaging gate. Once the film is thrust out of the cartridge the DC cartridge spool motor 20 is turned off and the nip rollers controlled by the stepper motor 18 are used solely to move the film out of the cartridge. To rewind the film both the stepper motor and the DC motor are turned on and film is retrieved back into the cartridge. Another DC motor (not shown) is used to switch the nip rollers from a high-speed gear to a low speed gear position. For gross film positioning such as when getting from one image frame position to another the high speed position is used. Scanning within a particular frame is done in the low speed position to achieve the desired image resolution.

A controller 30 is programmed through software to control the overall operation of the scanner as well as to perform basic data processing functions on the output signals from the CCD array, these functions including the bar code locating and detecting operations of the present invention. The controller operates the stepper motor and dc motor to thrust and transport the film through imaging station. The controller also operates to vary the step rate of the stepper motor to achieve desired image scan resolution and also to control the timing for the CCD sensor and the LED array. It also controls the data transfer interface 32 to transfer data from the scanner via a cable 34 to a host computer 36. Program commands from the host computer are also sent via the cable and interface to the controller 30.

Figure 3:
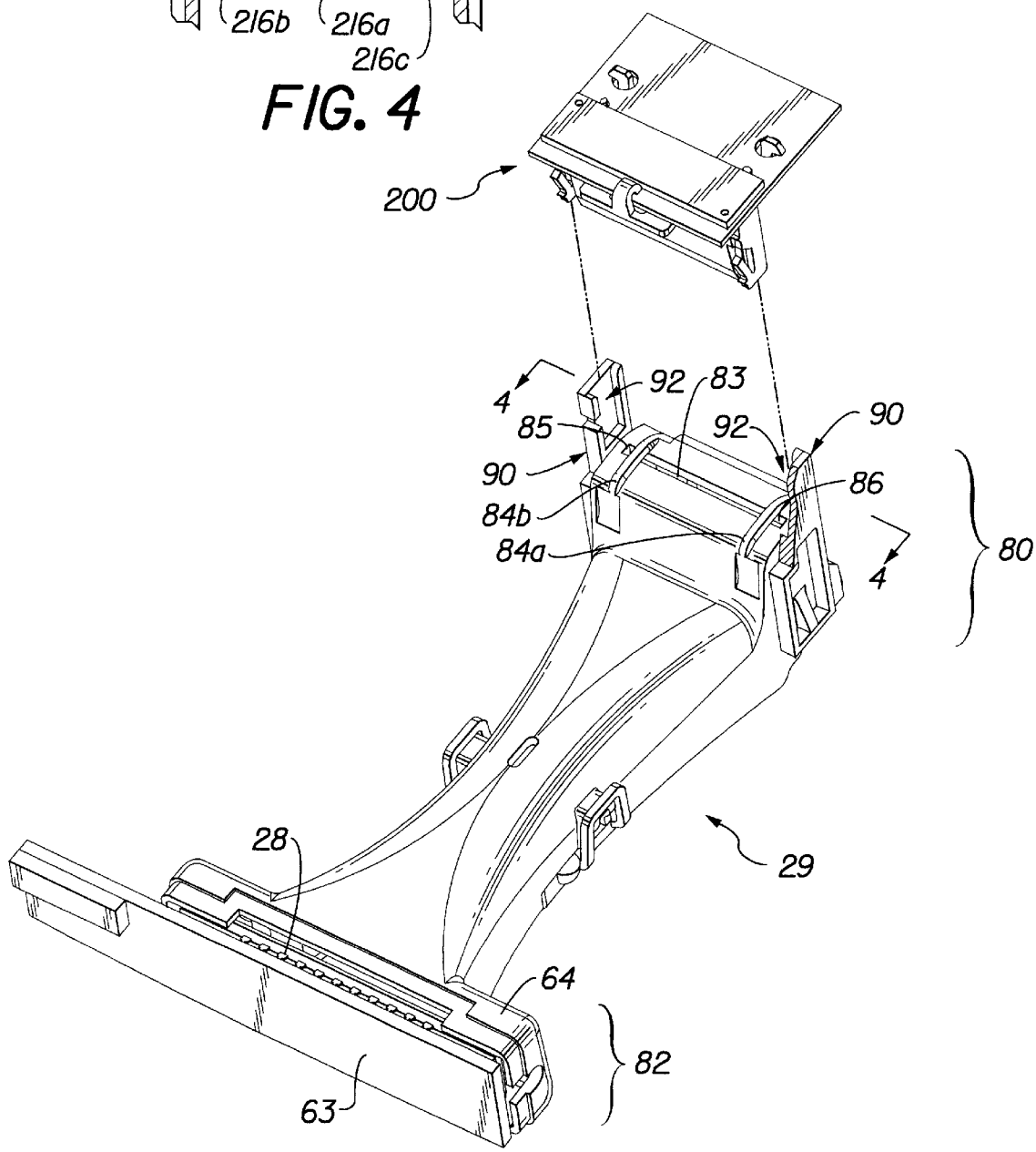
FIG. 3 is a three quarter, partially exploded perspective view of an imaging assembly and illuminant head assembly used in the scanner of FIG. 1.

FIG. 3 illustrates the imaging assembly 29 in greater detail. The assembly comprises a film scanner end 80 which is mounted in the film scanner 10 between the nip rollers 14a, 14b. The scanner end 80 includes an elongated scan light entry slot 83 and a pair of spaced apart film rails 84a and 84b spanning the slot 83. A pair of support arms 90 serve as support mounts for an illuminant head assembly 200 as shown in greater detail in FIG. 4. They also serve to define the width of the scan gate film path. The other end 82 of the imaging assembly comprises a sub-housing 64 which encloses the linear CCD array 28 mounted on printed circuit board 63 attached to the assembly housing.

Figure 4:
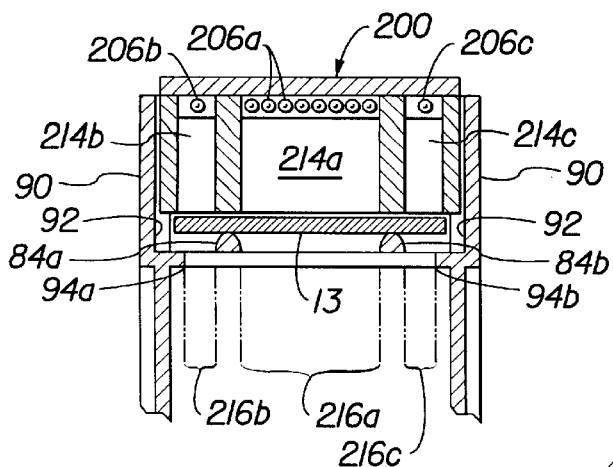
FIG. 4 is a cross section view of the scan gate portion of the imaging assembly and illuminant head assembly of FIG. 3.

The support arms 90 are preferably integrally molded on housing of the imaging assembly and are mirror images of each other. The upper portions of each of the support arms 90 are provided with a channel 92 to retain the housing of the illuminant head assembly with the light output end of the illuminant assembly in rigid precise aligned relationship with the light entry space between the film rails 84a and 84b define the length of the image scan line an extended image scanning slot between the film rails. The spaces between the film rails and extreme ends of the slot 83 define smaller light entry apertures 85 and 86 for exposing marginal edge regions of the film strip onto the image sensor. The film perforation side of the film passes over the aperture 85 and the bar code side of the film passes over aperture 86. Referring to FIG. 4, a lateral cross section of the scanning end 80 is shown as viewed from the film cartridge side of the scanning end. As seen in this view, film 13 is resting on the film rail 84a, 84b and is generally confined in the lateral (line scan) direction between the inner surfaces of the support arms 90. Illuminant assembly 200 is positioned inside the support arms with image scanning light channels aligned with light entry slot 83. A linear array of image scanning LEDs 206a is centrally located over light channel 214a positioned over the central image area of the film and the image scanning portion 216a of slot 83 between the film rails 84a, 84b. A separate LED 206b is aligned with light channel 214b and the bar code scanning aperture 216b defined between the film rail 84a and the adjacent end of slot 83. An additional separate LED 206c aligns with light channel 214c and perforation scanning aperture 216c defined between the film rail 84b and the adjacent end of the slot 83. In the illustrated embodiment, the ends of the light slot 83 terminate short of the inner surfaces of support arms 90, ending at ledges 94a and 94b which extend inwardly of the support arms by an amount sufficient to mask the edges of the film 13 from the light entry slot 93. The purpose of this optional feature is to minimize the undesired flare, ghosting and specular effects described above. While film transported through the scan gate shown in FIG. 4 is somewhat constrained between the support arms 90, it is not possible to provide absolute lateral constraint and, therefore, the film is able to wander slightly as it is transported through the scan gate. The inward extension of the ledges is set to be sufficient to account for this film wander.

Figure 5:
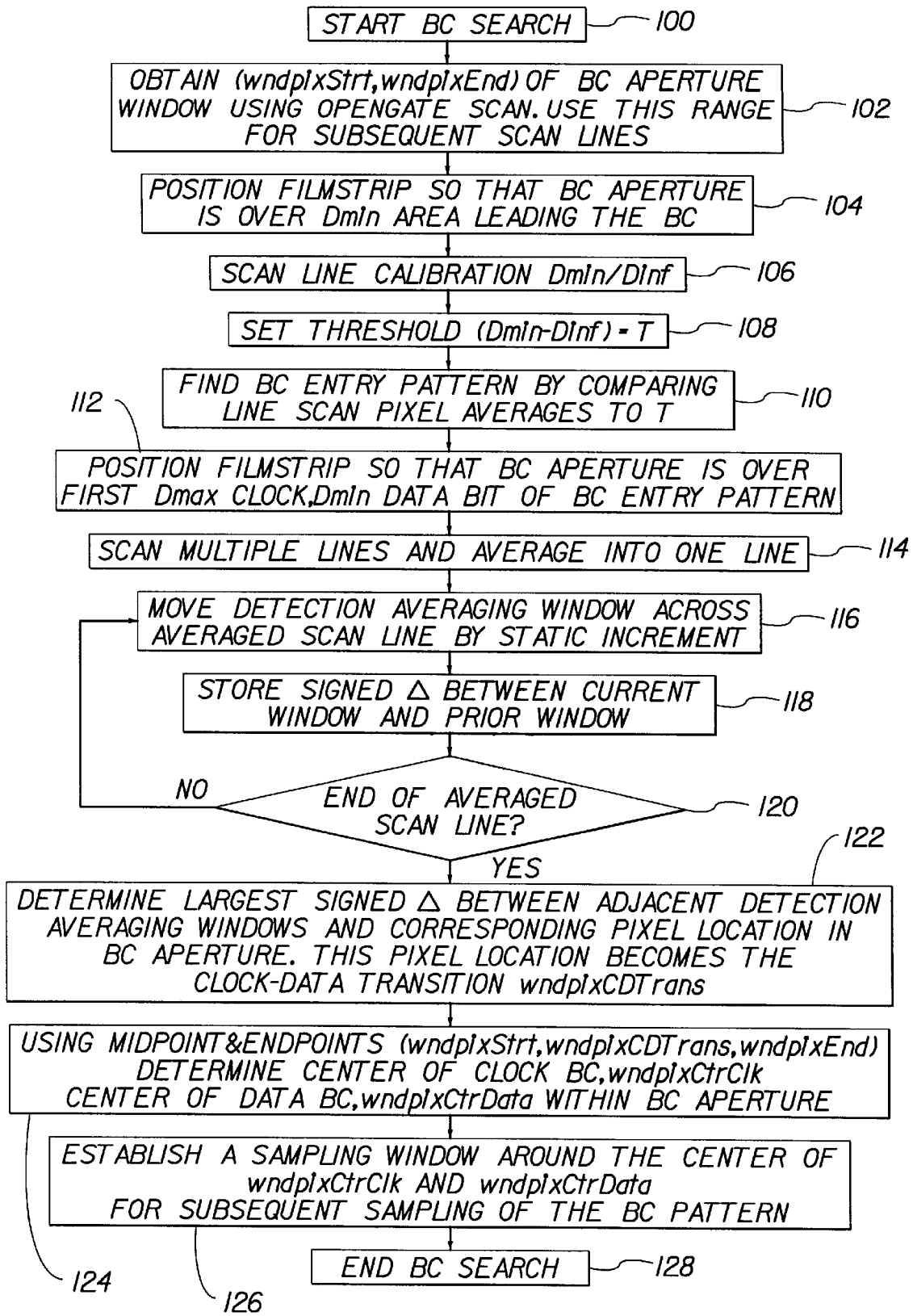
FIG. 5 is a high level program flow chart for the controller of the FIG. 1 scanner illustrating an operating embodiment of the present invention.

In order to sense and read the bar code clock and data elements from the film using a linear sensor array, it is necessary to locate the element images in the pixel-by-pixel linear sensor outputs. The flow diagram of FIG. 5 presents one such method for accomplishing this in accordance with the invention. Upon command from a host computer to which the film scanner 10 is connected, the controller 30 enters the "Start bc search" routine at step 100. The output of the CCD array is clocked out line by line and the signal amplitudes for each of the CCD pixel sensors are converted to digital values, pixel-by-pixel, in conventional manner. Before the film is thrust into the scan gate, the program performs an open gate scan and obtains, at step 102, the pixel locations, wndpixStrt and wndpixEnd, of the start and end points of the bar code window corresponding to bar code aperture 216b of the scan gate. Referring to the graphical showing in FIG. 6a, these locations correspond to points 140 and 142 of aperture window 144. Line 145 represents the relative position of the linear sensor to the film image focussed onto the sensor. In the embodiment represented in FIGS. 6a–6d, the window 144 is shown as being smaller in the lateral direction than the lateral width of the bar code pattern. As will be shown in embodiments described later, this feature is not essential to the broadest aspect of the invention and the window may be wider in the lateral (line scan) direction of the bar code pattern, extending beyond the clock edge 143 and/or the data edge 145. Referring back to the flow chart of FIG. 5, once the aperture limits are defined with the open gate scan, the stepper motor is then actuated in step 104 to move the film into the scan gate with the leader portion positioned directly over the bar code aperture 216b just ahead of the initial bar code pattern as shown in FIG. 6a. At step 106, the pixel outputs of the CCD are then calibrated to establish a uniform line of minimum and maximum pixel (sensor) output values corresponding to the Dmin value of the filmstrip shown by solid line 70 in FIG. 7a and a maximum value, Dinf, corresponding to that obtained with the bar code illuminant light 206b turned off as shown by dotted line 72.

Figure 5A:
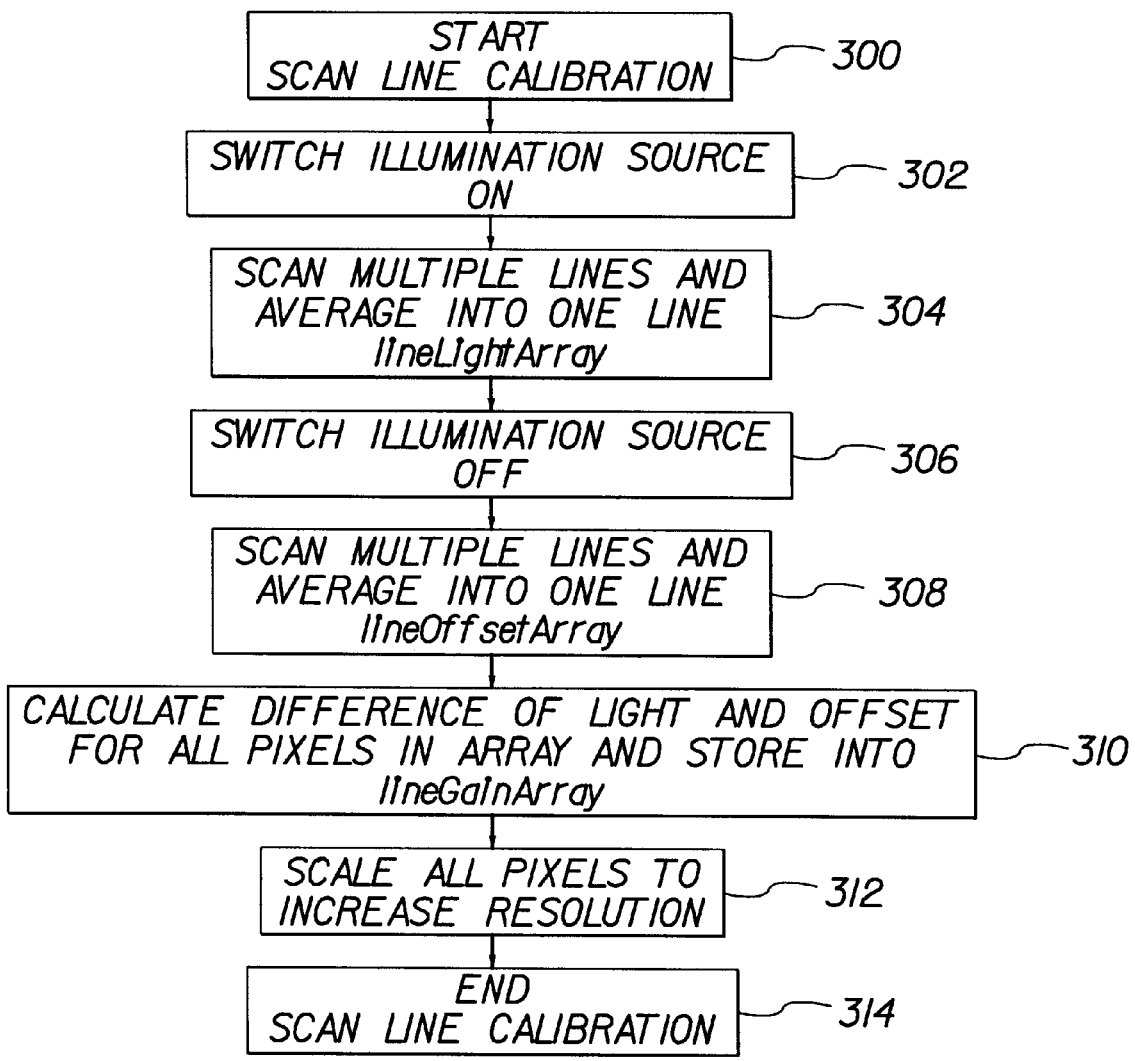

The calibration process of block 106 is shown in the flow chart of FIG. 5a. Upon entering at step 300, the process begins at step 302 by turning the bar code illuminant source ON. At step 304, the CCD is iteratively scanned to obtain multiple lines of pixel (sensor) data which are then averaged into a single line of pixel data: "lineLightArray", which represents the Dmin value of the filmstrip. At step 306, the bar code illuminant source is turned OFF and at step 308, the CCD is again scanned multiple times and averaged into a single line of pixel data, this time to obtain a single line of offset data: "lineOffsetArray" which represents the Dinf value. Step 310 determines the differences between the Line and Offset values for all the pixels to obtain a line of pixel-by-pixel gain values: "lineGainArray". These values are then scaled in step 312 to increase the resolution of the data values for each of the pixels. Step 314 then ends the scan line calibration process and returns to the process of FIG. 5. From the Dmin and Dinf values set in step 106, a suitable intermediate threshold value, "T", shown by dash-dot line 74 in FIG. 7a, is set in step 108, which may be midway between the Dmin and Dinf values, to establish a detection level that reliably indicates a transition between a region of film Dmin and the occurrence of a bar code pattern entry element.

The film is then advanced and the line-by-line clocked and scaled outputs of the CCD are monitored until, at step 110, with sensor line positioned over the entry pattern clock and data elements as shown in FIG. 6b, a transition in CCD pixel value above the threshold "T" is detected uniformly in the pixels within the window as shown by solid line in FIG. 7b. This indicates the presence of the entry point to the bar code pattern since, by convention, the bar code has maximum density in both the clock and data rows. The location of this transition to the entry pattern is identified by a motor step counter in known manner. Step 112 advances the film a predetermined number of motor steps to align the linear sensor with the first occurrence of the data entry pattern in which the clock element is at Dmax and the data element is at Dmin. This is shown by the negative transition of solid line 76 in the interval 150 of FIG. 7c. Since the entry pattern is a standard format, advancing the film a known number of motor steps will accomplish the proper positioning of this segment of the bar code image over the sensor. At step 114, a multiple number of lines are then scanned across the bar code window 144 by the CCD array and average pixel values are determined for each of the pixel locations in the bar code window. At step 116, a data processing loop routine is entered that sequentially moves a detection window 152 (FIG. 6c), that averages pixels within the detection window, across the determined averaged pixel value scan line by a static increment. The width of the detection window 152 is a matter of choice and may, for example, be 4 or 8 pixels wide. Similarly, the static value of incremental shift of the detection window 152 is a matter of choice and may be a single pixel or a plurality of pixels. The largest shift would be a number of pixels equal to the pixel width of the detection window which would be desirable from the standpoint of computational speed. A smaller pixel shift would possibly increase accuracy but it should nonetheless be a large enough shift that scratches or dust do not contribute to a large delta change in signal level over the previous window measurement. At each position of the detection window, the delta change in signal level between the detection averaging windows is stored in step 118. At step 120, the loop is continued until it is determined that the end of the averaged scan line has been reached. Once reached, the routine moves to step 122 in which the largest signed delta change in pixel value between detection averaging windows is determined along with the pixel location at which the delta occurred. The sign of the delta change in pixel value being searched for positive or negative) will depend on the scanner system convention. In the illustrated embodiment, a transition from a high density clock element to Dmin data element is in the negative direction and thus a negative delta is searched for and stored in steps 116 and 118. The location of the largest delta of the proper sign determines the pixel location of the clock to data transition. This pixel location is then set as "wndpixCDTrans" which is the transition point between the clock and data elements of the bar code pattern. In step 124, using this transition point as the midpoint location and the endpoint locations of the bar code window (wndpixStrt, wndpixCDTrans, wndpixEnd), the center points 156, 158 of the clock and data elements are determined (wndpixCtrClk, wndpixCtrData). Because of the standard nature of the bar code format, these points may be readily established as predetermined offsets from the clock to data transition line or, alternatively as fixed positions between the clock/data transition line and the outer ends 140, 142 of the aperture window 144. Given these element center point locations within the window, step 126 then sets element detection windows "CW" and "DW" for each of the clock and data element paths. These element detection windows are shown in FIG. 6d as the crosshatched areas bounded by pixel location points 160, 162 and 164, 166, respectively, and in FIG. 7d by the double dot-dash bounded intervals CW and DW. The widths of these element windows are a matter of choice but may be, for example, four or eight pixels wide in the line scan direction. Once all elements in the pattern have been detected, there being a fixed number of elements by convention, the program is ended at step 128.

It will be appreciated that establishing the transition between the clock and data elements is the basic feature of locating the bar code pattern for reading out the clock and data elements of the pattern in the embodiment just described. However, it has been found to be desirable to enhance the reliability of element detection to limit the extent of the element detection windows "CW" and "DW", as is done in step 126. The purpose of this is to avoid reading pixels at or close to the transition between clock and data elements since the region between where clock meets data may not register as a sharp transition pixel on the CCD sensor. It was therefore found to be desirable to stay away from this region in view of the potential for film wander which might well introduce transition signals from the field on the opposite side of the nominal transition line. It was further found to be desirable to avoid attempting to read element pixels near the extremes of the elements in the pattern to avoid experiencing subtle ghost reflections at the end of the data window. Consequently, the preferred embodiment employs defined element windows that are preferably centered on the barcode element fields with a safe distance provided between the end of the windows and the outer edges of the element fields.

Figure 8:
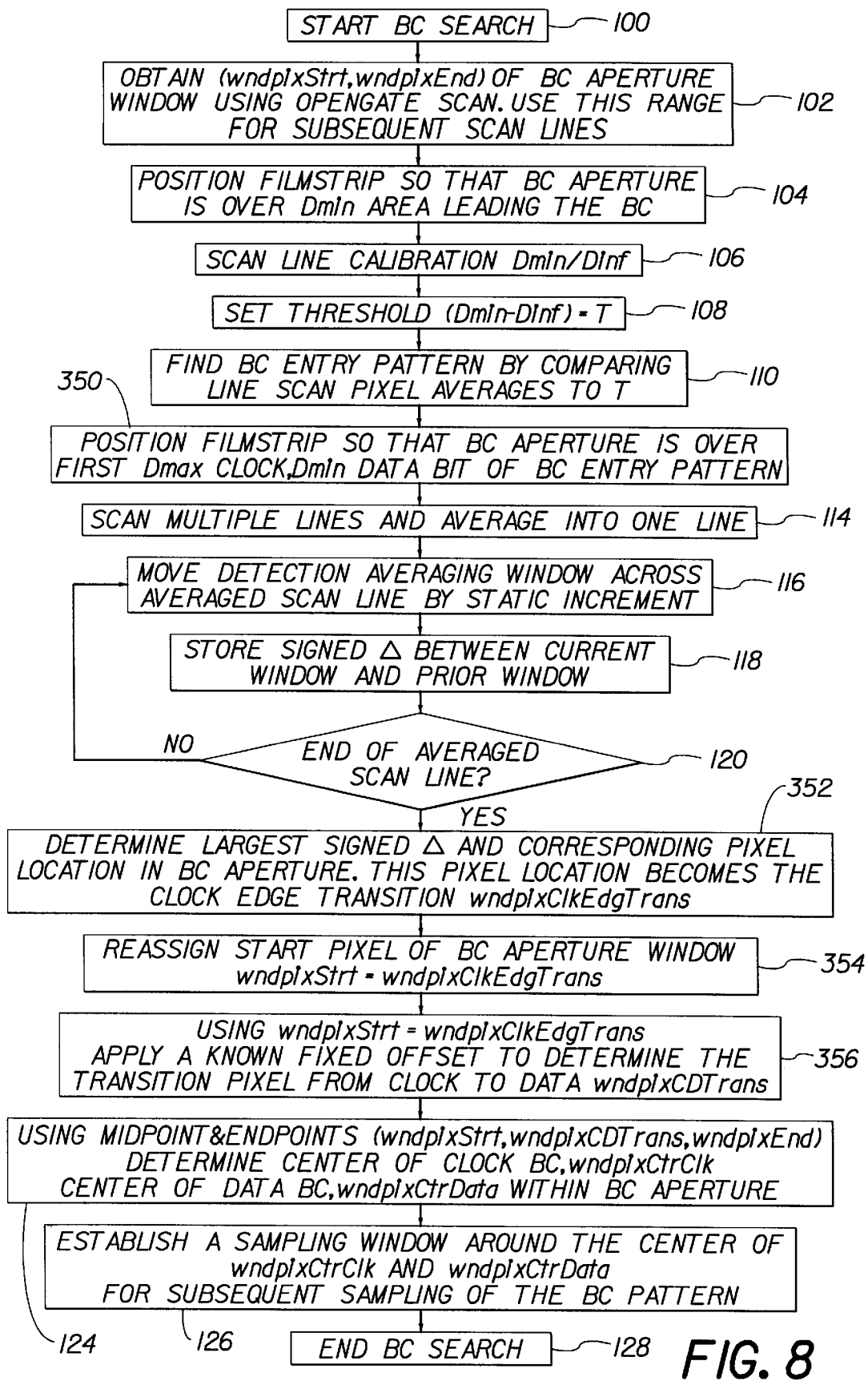
FIG. 8 is a high level program flow chart for an alternative embodiment of the invention.

In the embodiment just described, it will be remembered that the bar code aperture window, imaged onto the linear sensor is smaller in the line scan (cross scan) direction than the total lateral width of the bar code image pattern. For this reason the process is directed at locating the line of transition between the clock and data elements of the bar code and assigning element detection windows in relation thereto. Turning now jointly to FIGS. 8–10, there will be described a method of locating and reading a film bar code with a linear sensor in a scanner in which the aperture window 170 is longer in the lateral direction than the lateral width of the bar code pattern, at least to the extent that the aperture window extends beyond the clock edge which is remote from the data elements. For convenience, the term "clock edge" is defined for purposes of the description and claims herein as being that edge 169 of the clock element, including the entry clock element, that extends in the longitudinal direction of the filmstrip and is located remote from the line of transition between the clock and data elements. With the pattern shown in FIG. 2, the clock edge is the edge of the clock element closest to the central image frame area of the film. Turning now to the program flow chart of FIG. 8, a number of the steps in the chart are the same as corresponding steps in FIG. 5 and, consequently, carry the same reference numerals. The description of these same steps is not repeated in detail herein and thus the present description focuses on those steps which are new to the this alternative embodiment. In the process of FIG. 8, steps 100 through 110 operate in the same manner to establish aperture window end points, to perform scan line calibration, and to locate the start of the barcode entry pattern. Step 350 then moves the film a fixed small number of motor steps to align the first element of the entry pattern, i.e. in which both clock and data element is at maximum film density, is positioned over sensor line 174 as shown in FIG. 9b. Step 114 then performs multiple scans to derive an average line value having the profile shown in FIG 10b. Data processing steps 116–120 move a detection window laterally across the data profile to find and store the location of the signed delta change exceeding the threshold value T. It will be appreciated that the aperture window 170, being larger than the barcode pattern has an endpoint 172 that aligns with the Dmin area of the film. Thus, as seen in FIGS. 10a and 10b, the pixel values start at Dmin and transition to a level above threshold T. Step 352 locates from the stored signed deltas the pixel location where this clock edge transition occurs and sets the location value as "wndpixClkEdgTrans". Step 354 reassigns the start pixel of the barcode aperture window to this new clock edge location value. Step 356, with this new reference location value, applies a known fixed offset to determine the clock to data line of transition "wndpixCDTrans". The concluding steps 124–128 then operate in the same manner as in FIG. 5 to establish the clock and data detection windows to read the barcode. Alternatively, with the known clock edge location "wndpixClkEdgTrans", the detection windows could be established using fixed offset values directly from the clock edge location.

Figure 11:
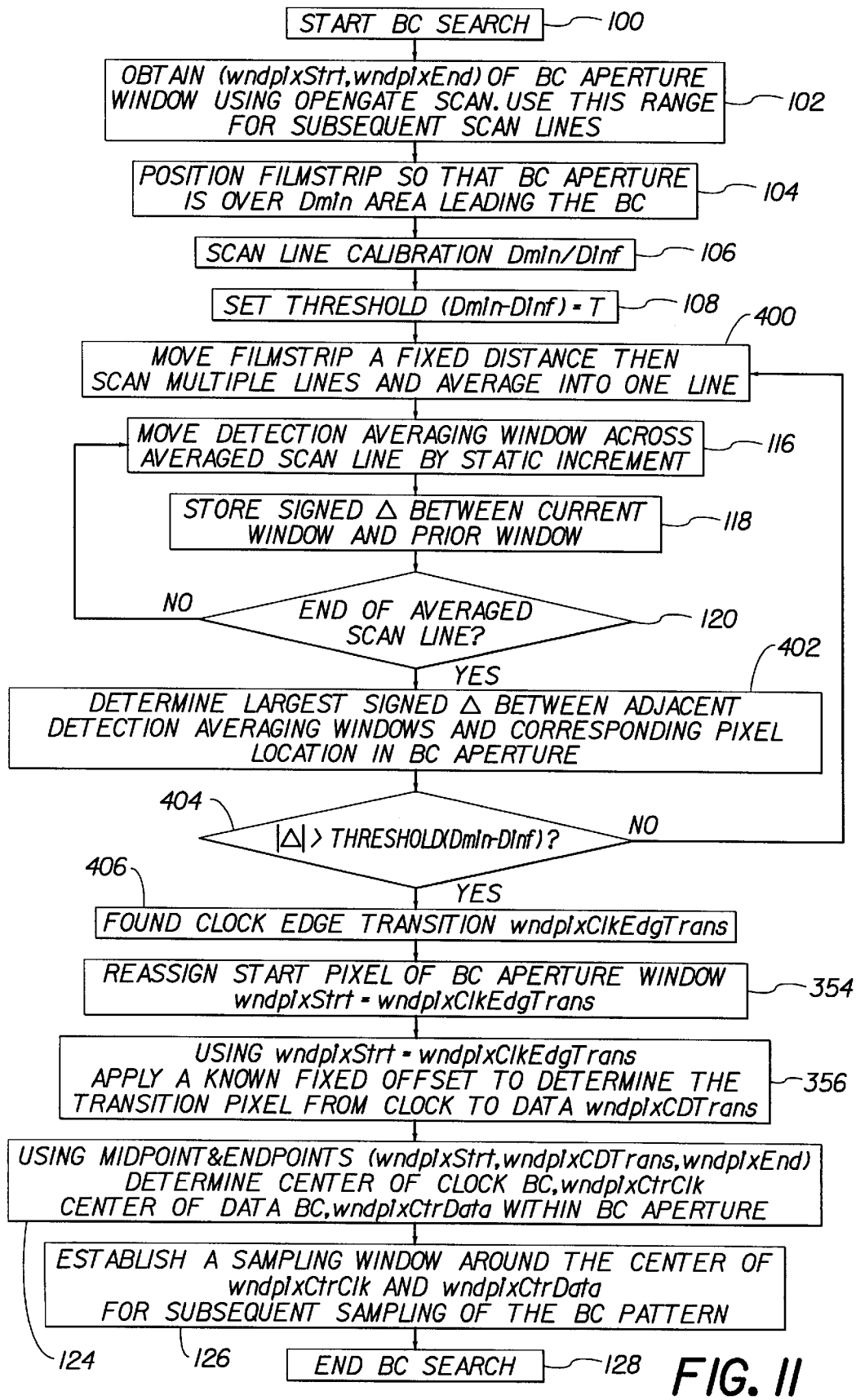
FIG. 11 is a high level program flow chart for yet another alternative embodiment of the invention.

Turning now jointly to FIGS. 11–13, a further embodiment of the invention will be described. In this embodiment, like that of FIG. 8, the aperture window is oversized relative to the bar code pattern and thus the clock edge is located rather than the line of transition between the clock and data elements as in FIG. 5. However, the method of determining the location of the clock edge differs from that of FIG. 8. Here again, steps which are the same as those of either FIG. 5 or FIG. 8 carry the same reference numerals and are not discussed in detail. Steps 100–108 operate as before to define the aperture window limits and set the Dmin, Dinf and threshold T levels with the aperture window positioned in advance of the barcode position. Step 400 actuates the stepper motor to move the film a small fixed distance bringing the barcode entry pattern closer to the aperture window 170 (FIG. 12) and multiple line scans are performed within the aperture window and averaged to generate an single averaged scan line profile. Data processing loop comprising steps 116–120 moves a averaging detection window across the scan line profile to find and store signed deltas. After the line scan analysis is completed as determined by query step 120, step 402 finds the largest signed delta between adjacent averaging detection windows and query step 404 determines if the absolute value of the delta is greater than the threshold "T" as shown in FIG. 13. If not, the process returns to step 400 to advance the barcode pattern closer to the aperture window and to repeat the analysis loop and delta comparison to the threshold "T". Once the sensor line 174 aligns with the barcode entry element, as shown in FIG. 12, query step 404 determines that the delta change exceeds the transition "T", and step 406 then sets the clock edge transition position as "wndpixClkEdgTrans". After this, the remainder of the flow chart in FIG. 11 operates the same as that of FIG. 8 to reassign the start pixel of the aperture window and to set the locations of the detection windows for subsequent sensing and reading of the barcodes on the film. It will be appreciated that the primary difference between the process of FIG. 11 over that of FIG. 8 is that, in FIG. 11, the clock edge location is determined directly using detection window scans of successive aperture window line scans while in FIG. 8, the process first locates the leading edge of the entry pattern and then performs detection window scan to locate the clock edge of the barcode pattern.

The invention has been described in detail with particular reference to certain preferred embodiments thereof, but it will be understood that variations and modifications can be effected within the spirit and scope of the invention.

PARTS LIST

100–128 program flow chart
140–142 bar code window limits
160–162 clock detection window
164–166 data detection window
10 film scanner
12 film cartridge
13 filmstrip
14a,b nip rollers
16 film takeup chamber
18 stepper motor
20 dc motor
24 mirror
26 lens
28 CCD array
29 imaging assembly
30 controller
32 host interface
34 cable
36 host computer
63 printed circuit board
64 subhousing
83 light entry slot
84a,b film rails
85 bar code scan aperture
86 perforation scan aperture
90 support arms
92 support arm channels
94a,b masking ledges
144 bar code window
146 bar code entry pattern
150 bar code clock/data bit
152 detection window
154 clock/data transition
158 clock/data element center points
200 illuminant head assembly
206a,b,c illuminant LEDs
214a,b,c light channels
216a,b,c light entry apertures

What is claimed is:

1. A bar code reader for reading an optical bar code image having parallel rows of clock and data elements extending longitudinally along the length of a filmstrip, the row of clock elements having at least one longitudinally extending edge transition, the reader comprising:

a film path;

an illuminant source;

a linear, pixel-by-pixel light sensor array for detecting illuminant from said source passing through said filmstrip in a region encompassing said bar code image;

a scanning aperture defining a window of exposure of said illuminant source through said bar code onto said light sensor array;

a light sensor array for detecting illuminant from said source passing through said film in a region encompassing said bar code image; and a data processing controller responsive to output information from the light sensor array from within said bar code exposure window for laterally locating said longitudinal edge transition of an element in the row of clock elements and for determining binary values of the clock and data elements from the sensor array output information at predetermined spaced locations relative to the located edge transition of the element in the row of clock elements.

2. The reader of claim 1 wherein said located clock edge transition is a line of transition between said rows of clock and data elements.

3. The reader of claim 1 wherein said located clock edge transition is a line of transition remote from said row of data elements.

4. The reader of claim 1 wherein said located clock edge transition is a line of transition adjacent a central image area on the filmstrip.

5. The reader of claim 1 wherein said scanning aperture includes a mask portion restricting said window of exposure to a region inward of an edge of said filmstrip.

6. The reader of claim 1 wherein said scanning aperture includes a mask portion restricting transmission to said light sensor array of light from said illuminant to a region of said filmstrip which is inward of an edge of the filmstrip.

7. A method in a film scanner of adaptively locating and reading a bar code image imprinted adjacent an edge of a filmstrip, the bar code image having abutting rows of clock and data elements said clock elements having a line of edge transition extending longitudinally along the filmstrip, the film scanner having an illuminant source and a linear light sensor array for detecting light from the illuminant source transmitted through said bar code image, the method comprising:

passing said filmstrip bar code image over a bar code scanning aperture;

transmitting said illuminant light through said bar code image and scanning aperture toward said light sensor array thereby defining a window of exposure of said illuminant light onto said linear light sensor array;

processing output information from said light sensor array to determine lateral location of said clock element line of edge transition;

establishing clock and data element detection windows at predetermined spaced locations from said located longitudinally extending edge transition of a clock element; and determining binary values of the clock and data elements in the bar code image from light sensor array output information in said clock and data element detection windows.

8. The method of claim 7 wherein said located edge transition of a clock element is a line of transition between said clock and data elements and said clock and data element detection windows are on opposite sides of said line of transition between said clock and data elements.

9. The method of claim 7 wherein said located edge transition of a clock element is a clock edge transition remote from said data elements. and adjacent to image frame regions on said filmstrip.

10. The method of claim 7 wherein said located edge transition of a clock element is a clock edge transition adjacent to image frame regions on said filmstrip.

11. A method in a film scanner of adaptively locating and reading a bar code image imprinted adjacent an edge of a filmstrip, the bar code image having abutting rows of clock and data elements said clock elements having a line of edge transition extending longitudinally along the filmstrip and said bar code includes an entry element comprising a clock and data element of high density, the film scanner having an illuminant source and a linear light sensor array for detecting light from the illumninant source transmitted through said bar code image, the method comprising:

passing said filmstrip bar code image over a bar code scanning aperture;

transmitting said illuminant light through said bar code image and scanning aperture toward said light sensor array thereby defining a window of exposure of said illuminant light onto said linear light sensor array;

processing output information from said light sensor array to determine lateral location of said clock element line of edge transition;

establishing clock and data element detection windows at predetermined spaced locations from said located longitudinally extending edge transition of a clock element, defining lateral beginning and end points of said aperture window by an open gate line scan and thereafter processing said output information from within said defined beginning and end points of the aperture window to locate said edge transition of a clock element; and;

determining binary values of the clock and data elements in the bar code image from light sensor array output information in said clock and data element detection windows.

12. The method of claim 11 further including moving said filmstrip through said defined aperture window; performing successive line scan operations as the filmstrip is moved; and locating a leading edge of said entry element from output information from said light sensor from within said defined aperture window.

13. The method of claim 12 further including moving said filmstrip a predetermined distance from said located leading edge to align a predefined portion of the barcode with said defined aperture window and wherein said processing of output information comprises performing at least one line scan on said predefined portion of the barcode to produce a profile of the barcode in said output information and said processing of output information further includes locating a maximum delta change of transition value to locate said longitudinally extending edge transition of a clock element.

14. The method of claim 13 in which said predefined portion of the barcode is a position at which the clock element has a maximum density value and the data element has a minimum density value and said located delta change of transition value corresponds to a line of transition between said clock and data elements.

15. The method of claim 13 wherein said predefined portion of the barcode is a position at which the clock and data elements both have maximum density value and said located delta change of transition value corresponds to a clock edge of the clock element.

16. The method of claim 15 wherein said clock and data element detection windows are established at predetermined offset locations spaced from said located clock edge of the clock element.

17. The method of claim 11 further including moving said filmstrip through said defined aperture window, performing successive line scan operations as the filmstrip is moved; said processing of output information from said light sensor array is performed on each successive line scan to locate a clock edge of said clock element.

18. The method of claim 17 wherein said clock and data element detection windows are established at predetermined offset location spaced from the located clock edge of the clock element.

* * * * *